Oct. 11, 1932.  R. B. HANCOCK  1,882,141
APPARATUS FOR ANNEALING BARS
Filed May 13, 1927  4 Sheets-Sheet 1
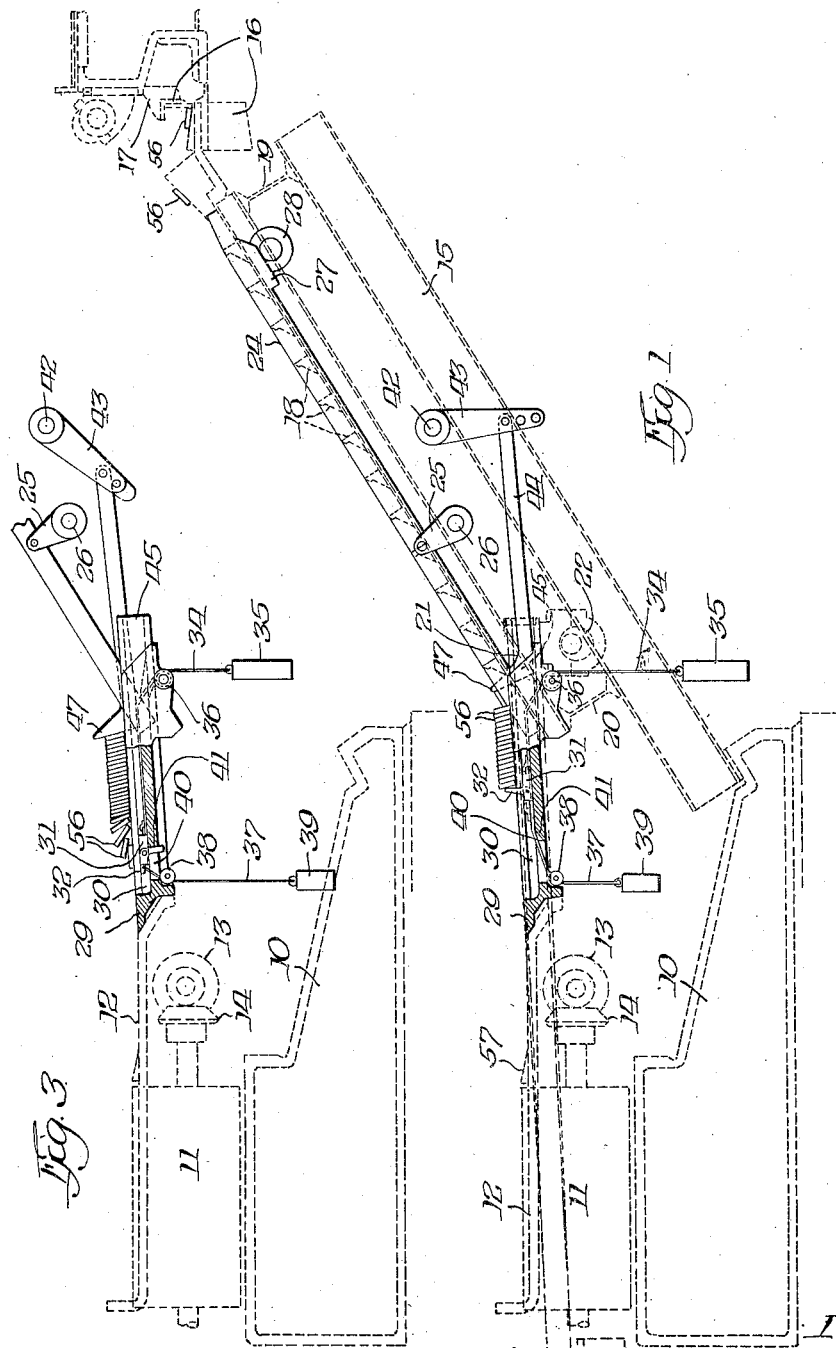

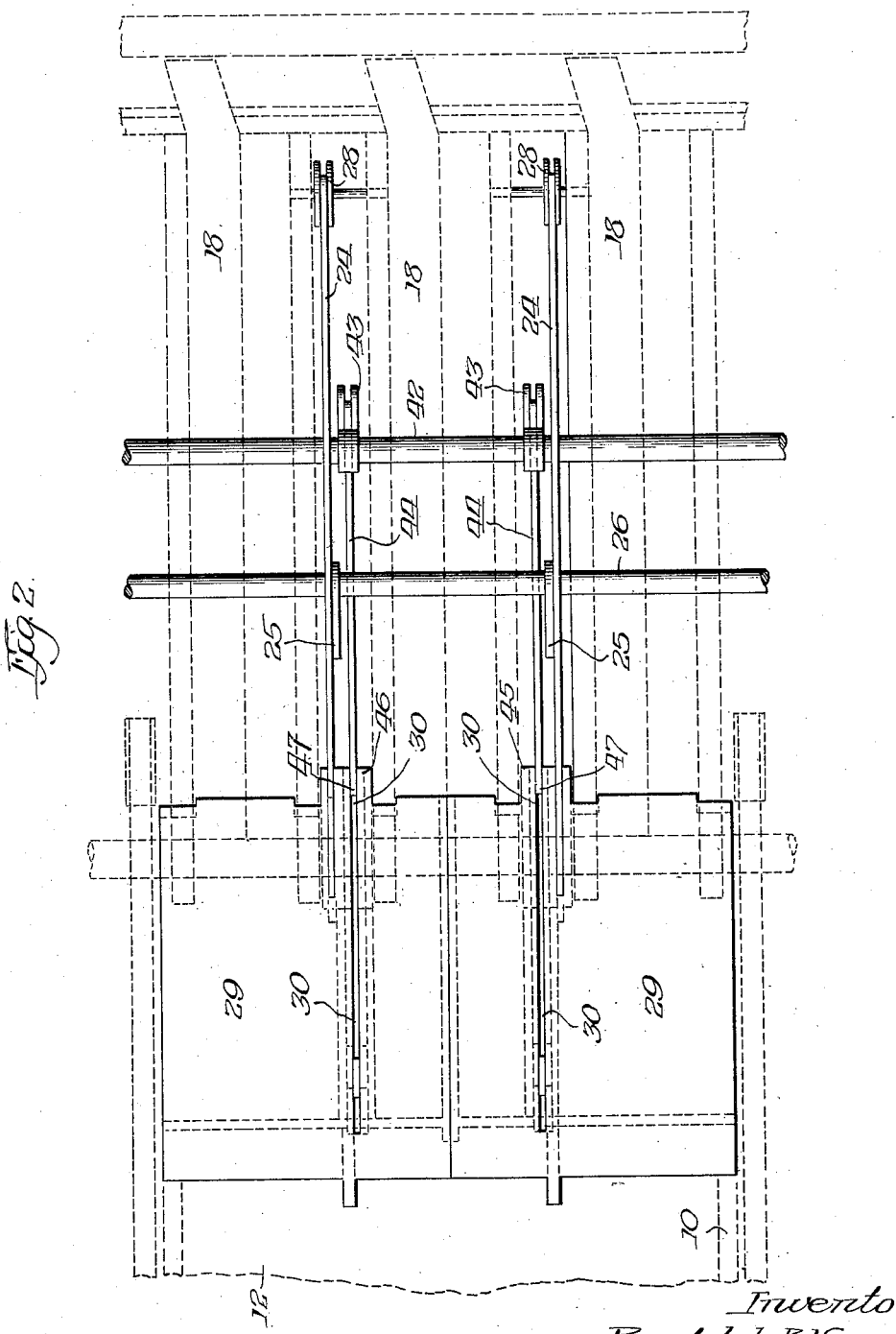

Oct. 11, 1932.   R. B. HANCOCK   1,882,141
APPARATUS FOR ANNEALING BARS
Filed May 13, 1927   4 Sheets-Sheet 3
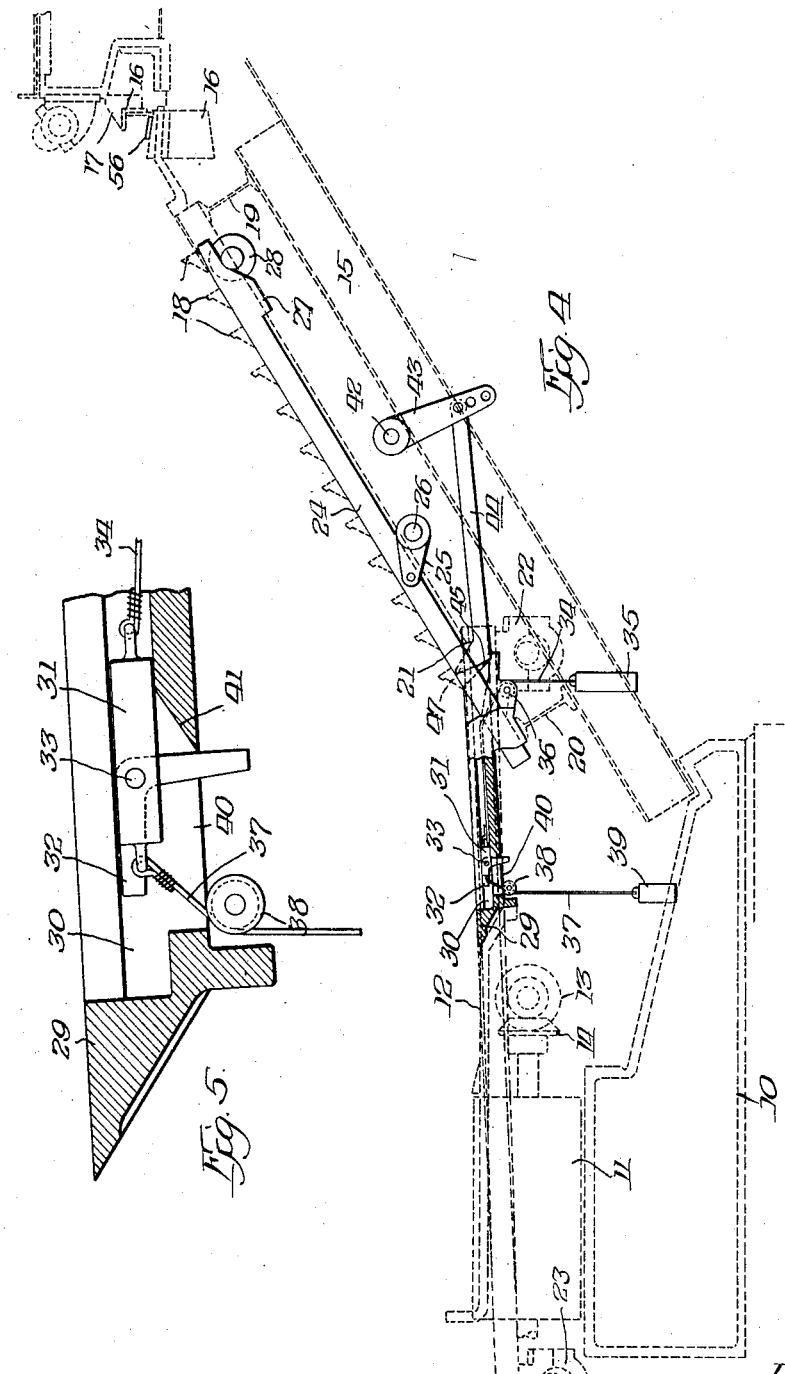

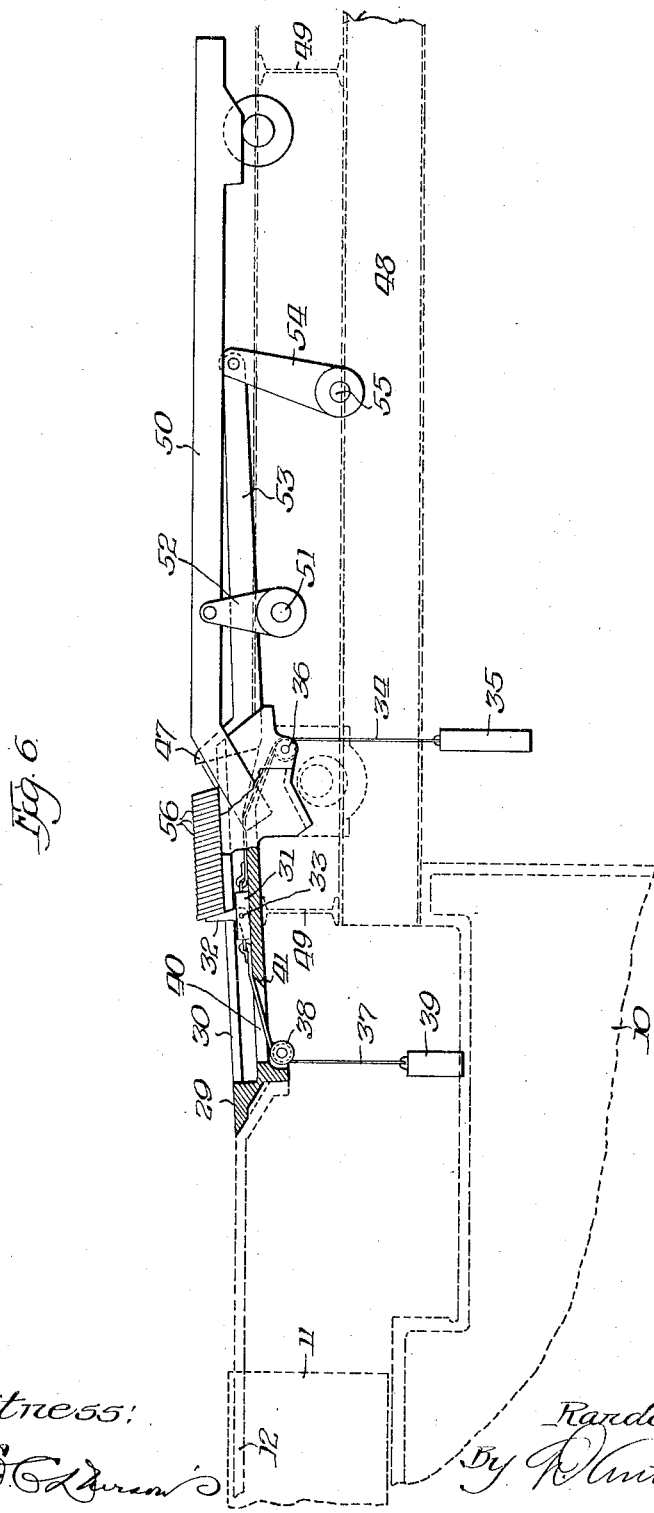

Patented Oct. 11, 1932

1,882,141

UNITED STATES PATENT OFFICE

RANDOLPH B. HANCOCK, OF GARY, INDIANA

APPARATUS FOR ANNEALING BARS

Application filed May 13, 1927. Serial No. 191,110.

My invention relates to method and apparatus for continuously cooling and annealing metal bars and has for its primary object the building up and maintaining of a pack of these bars which are allowed to cool in the pack for a predetermined time, while from one side thereof the cooled bars are removed to be sheared or bundled, while hot bars from the rolls are placed on their edges in side to side relation with each other against the pack at the opposite side.

A further object of my invention is the provision of method and means for preventing the rapid cooling of metal bars, particularly flat metal bars rolled for the purpose of making automobile springs and the like, and which when placed upon a cooling bed singly, cool too rapidly.

In my improved device the bars are packed with the flat sides of the bars together and allowed to remain in the pack for a predetermined time, thus prolonging the cooling operation and allowing the bars to become annealed during the cooling operation. In this manner the quality and temper of the bars is very materially improved.

In the present practice of rolling bars of this character, they are placed upon a hot bed for cooling purposes usually being kicked off the roll table by any suitable discharge mechanism, upon an inclined table having a plurality of rocking bars which are moved sideways, moving the bars down to a cooling table across which they are moved by shuffle bars onto a roll or run out table, where they are moved to the shears or bundling device. In my improved mechanism, after being ejected from the kick out mechanism the bars are allowed to slide downward on skids and are packed together on apron plates at the bottom of the skids by a suitable packing arrangement, and held in this position for a predetermined length of time, while being allowed to cool. After the bars are cooled sufficiently, the first bars gathered in the pack are removed by the shuffle bars onto the roll table which conveys them either to the shears or the bundling device, as may be desired. At the same time hot bars from the rolls are being added to the pack at the opposite side.

These and other objects of my invention will be more fully and better understood by reference to the accompanying drawings in which—

Figure 1 is an end elevational view of my improved invention;

Figure 2 is a fragmentary plan view of the usual hot bed embodying the apparatus in my invention;

Figure 3 is a detailed view showing the piling device;

Figure 4 is a transverse sectional view showing a hot bed in normally operative position;

Figure 5 is a detailed sectional view of the sliding block and trigger employed for assisting in the stacking of the bars; and Figure 6 is an end elevational view of a modified form of my invention.

Referring now specifically to the drawings and in which the usual hot bed arrangement and handling mechanism are illustrated in dotted lines, and in which my improved invention is illustrated in full lines, a frame 10 of a roll or run out table is illustrated having the usual rolls 11 mounted thereon, with apron plates 12 being provided which extend between the rolls with suitable gears 13 and 14, by means of which the rolls 11 in the roll table are actuated. At one side of the frame 10 is mounted a plurality of angularly disposed frame members 15, the lower ends of which rest upon the roll table frame 10, and the upper ends of which are supported in any suitable manner adjacent the conveying roll table 16, which receive the bars after they are ejected from the last pass and from which they are removed by any suitable kick-off mechanism 17, which operates successively, kicking the bars onto the hot bed racks 18, 18, which are supported by means of cross sills 19 and 20 mounted upon the angularly disposed frame members 15. These hot bed racks 18 are adapted to rock sidewise, thereby allowing the bars to pass downward by gravity in a step by step movement onto a plurality of shuffle bars 21, which are mounted upon eccentrics 22 and 23 (Fig. 1) at each of their ends, these shuffle bars and bearings being capable of vertical movement at each of their ends and by means of which the bars after reaching the apron plates 12 are moved across onto the roll table 11 which conveys them to the shears or the bundling device. This arrangement is the usual form of handling bars which are fairly thick and which do not require special annealing treatment.

In my improved device I provide a plurality of skids 24, 24 which are mounted at their lower ends upon cranks 25, 25 secured to a transversely extending shaft 26 and have cam-shaped projections 27 mounted upon rollers 28 at their upper ends and which, through the rotation of the shaft 26, are moved into position shown in Figure 1, so that the upper edges of these skids are above the rocking bars, these skids when in their upper position permitting the bars to slide down to the bottom of the skids by gravity after they are removed from the roll 16 by the kick-off mechanism 17. At the bottom of the incline and between the apron plates 12 leading to the run out table 11, I provide a series of short apron plates 29, 29 having channel shaped grooves 30, 30 therein, which form guides for blocks 31 having an angular trigger 32 secured thereto by means of a rivet 33, the said trigger being angular in position and rotatable about the rivet 33, the blocks 31 having a cable 34 secured to the forward end thereof, to the end of which a counterweight 35 is secured, the said cable passing over a pulley 36 which is secured to the inner ends of the apron plates 29 in any suitable manner. A second cable 37 is attached to the rear end of the block 31, passes over a pulley 38 and has a counterweight 39 secured thereto, the said cable passing through an opening 40 in the apron plate 29. The apron plate 29 at the forward edge of the opening 40 is inclined at 41 forming a track for the lower end of the trigger 32, the apron plate itself at the bottom of the channel forward of the opening 31 forming a track upon which the rear end of the trigger 32 slides at the beginning of the packing operation. The front counterweight 35 is greater in weight than the rear counterweight 39, so that the normal position of the trigger is forward adjacent the ends of the inclined skids 24, in which position the trigger with the rear portion engaging against the bottom of the apron plate, is in an upstanding position projecting above the top of the apron plate 29 (Fig. 1) and slightly backwardly inclined in position to support a bar after it has been turned to edgewise position after it slides down the skids 24. The counterweights attached to the sliding block 31 are so adjusted to weight that the force exerted by the front counterweight on the block 31 is slightly less than the resistance of the friction against the apron plate of the flat bars which are being cooled, and the pull of the weight 39, so the bars will not be moved by this counterweight.

Mounted upon the members 15 is a transversely extending shaft 42 having a pair of crank arms 43, 43 thereon which are attached to a pair of pusher bars 44, 44, the forward ends of the pusher bars resting in the forward ends of the guideways 30 which extend into projecting portions 45 and 46 (Fig. 2) of the apron plates 29, the forward end of the bars 44 having angularly disposed pushing heads 47 formed thereon, which are adapted to engage against the edge of the bar and push it into a position where the bar is resting on its edge, as shown in Figure 1. The grooves 30 near the forward edge of the apron plates, have inclined bottoms (Fig. 1) so that as the shaft 42 is rocked by any suitable power mechanism, the pusher head in addition to traveling backward and forward, slides on the inclined bottom of the grooves and raises upward thereby lifting the edge of the bar adjacent the head 47, thereby assisting in turning the bars into the edge positions. A plurality of holes are provided in the cranks 43 by means of which the pusher arms 44, 44 can be adjusted to different positions, thereby controlling the distance of travel of the pusher heads 47.

In Figure 6 is illustrated a modified form of my invention in which frame members 48 are provided having transverse sills 49, 49 thereon supporting the rocking bars in a horizontal position. Skids 50 are provided which are mounted upon a transversely extending shaft 51 by means of a crank member 52, with a pusher bar 53 mounted upon a crank arm 54 which in turn is secured to a transversely extending shaft 55, this device operating in exactly the same manner as the device heretofore described, except that the bars may be moved across the skids by shuffle bars as they are delivered from the kick-off mechanism heretofore described, or the device may be positioned close enough to the kick-off mechanism so that the bars are caught by the pusher bars and pushed forward and packed into position in the same manner as heretofore described.

When handling thin bars or bars which are apt to cool too quickly, the skids 24 are raised into the position shown in Figure 1, above the rocking bars, so that when one of the bars 56 is ejected from the roll 16 onto the skids 24, it slides downward thereon until it reaches the bottom of the incline where it lodges against the trigger 32 which has been pulled into the forward position by the counterweight 35 and extends above the apron plates 29. This portion of the finger is inclined backward a short distance so that the bars when being lodged against this finger or trigger, are slightly inclined backwardly. As the first bar rests against the finger the pushers 44 are operated so that the head comes forward adjacent the bar and turns the bar up into edgewise position against the trigger. The pusher bar is then withdrawn and as the second bar comes down it lodges against the first bar and the operation is repeated until a pack of bars is formed on the apron plates 29, these bars being packed successively against the trigger and the pack moved progressively across the apron plates 29 until the trigger 32 reaches the opening 40 in the apron plate 29, when the lower part of the trigger, due to the pressure of the bar, slides down upon the incline 41 and the first few bars drop down in the position shown in Figure 3. The apron plates 29 are inclined slightly towards the runout table or rolls 11.

In this position the bars come into contact with the shuffle bars which have been raised until they contact with the few bars at the outer edge of the pack, and these bars are moved across onto the apron plates 12 and if desired, across the triangular shaped member 57, onto the runout table made up of the rolls 11 and carried to the shears. The greater part of the bars remain packed in edgewise position, as shown in Figure 3, and as the new bars are added to the pack by the pusher rod, the whole mass is pushed over until the cooled bars are engaged by the shuffle bars and moved onto the runout table. This operation is repeated as long as the bars are delivered onto the inclined skids, the bars being packed and kept in a group to allow for slow cooling and the necessary annealing of the bars while they are held in the group. The trigger remains in the position shown in Figure 5, while the bars are passing thereover, and it will be understood is only used during the initial formation of the pack of bars.

The first bar in the pack may cool too rapidly making it necessary to discard this bar and the last bar, at the close of operations may also cool too rapidly by reason of the exposure of the last bar to the air for a longer period of time than is usually contemplated when the bars are in the pack, so that it may be necessary to discard this bar also, but throughout the entire operation it will be understood that the bars are held together in packed relation with the cool bars being removed from one side of the pack as they cool, at the same time that other hot bars are added to the pack at the opposite side, so that the operation is continuous as long as the bars are delivered from the rolls. After delivery of the bars is discontinued, the pack is moved across the apron plates by gradually lifting the shuffle bars until the entire pack of bars has been removed to the runout table. It will be understood that the shuffle bars are capable of being raised or lowered at either of their ends in order to enable them to move the bars across the apron plates onto the roll table at any point desired, and when the bars are moved onto the runout table, it is necessary to lift the outer ends of the shuffle bars high enough to cause them to deliver the bars 56 onto the runout table.

While I have described more or less precisely the details of construction, I do not wish to be understood as limiting myself thereto, as I contemplate changes in form and the proportion of parts and the substitution of equivalents, as circumstances may suggest or render expedient without departing from the spirit or scope of my invention.

I claim:

1. Bar packing mechanism comprising in combination, a table, a movably mounted stop in said table, a rotatably mounted trigger secured to said stop, and a plurality of pusher bars adapted to pack the bars on said table against the said trigger.

2. Bar piling mechanism comprising in combination, a table, a sliding carriage mounted in said table, a pivotally mounted trigger mounted in a groove in said table, and a plurality of pusher bars adapted to pack the said bars against the movably mounted trigger.

3. Bar packing mechanism comprising in combination, a table having a channel therein and an opening therethrough at one end of said channel, a slidably mounted carriage, a plurality of counterweights attached to said carriage, a rotatably mounted trigger secured to said carriage forming a stop for the reception of bars packed on said table, and a plurality of pusher bars adapted to turn said bars on edge and pack the said bars against the said trigger.

4. Bar packing mechanism comprising in combination, a table having a channel therein and an opening therethrough at one end of said channel, a slidably mounted carriage, a plurality of counterweights attached to said carriage, a rotatably mounted trigger secured to said carriage forming a stop for the reception of bars packed on said table, and a plurality of pusher bars adapted to turn said bars on edge and pack the said bars against the said trigger, one of said counterweights being greater in weight than the other of said counterweights.

5. Bar packing mechanism comprising in combination, a table having transversely extending channels therein, and openings therethrough at one end of said channels, a sliding carriage mounted in said channels, a pair of counterweights adapted to move said carriage in the said channel, a pivotally mounted trigger carried by said carriage and adapted to normally project in the path of bars on the said table, and a plurality of reciprocating pushers adapted to engage the said bars and turn them into edgewise relation onto said table.

6. A bar packing mechanism comprising in combination, a table, having transversely extending channels therein and openings therethrough at one end of said channels, a carriage mounted in said channels, counterweights secured to said carriage, an angularly shaped pivotally mounted trigger secured to said carriage, one end of which is adapted to form a stop for the bars packed on said table, the other end of said trigger normally contacting with the said table but adapted to project through the opening in said table when in a predetermined position with relation to said table, and a plurality of reciprocating pusher bars having angularly positioned heads thereon adapted to turn the said bars into edgewise relation and pack them on said table.

7. Bar packing mechanism comprising in combination, a table having transversely extending channels therein and openings therethrough at one end of said channels, a carriage mounted in said channels, counterweights secured to said carriage, an angularly shaped pivotally mounted trigger secured to said carriage, one end of which is adapted to form a stop for the bars packed on said table, the other end of said trigger normally contacting with the said table but adapted to project through the opening in said table when in a predetermined position with said table, and a plurality of reciprocating pusher bars having angularly positioned heads thereon adapted to turn the said bars into edgewise relation and pack them on said table, said pusher bars sliding in grooves in said table.

8. Bar packing mechanism comprising in combination, a table having transversely extending channels therein and openings therethrough at one end of said channels, a carriage mounted in said channels, counterweights secured to said carriage, an angularly shaped pivotally mounted trigger secured to said carriage, one end of which is adapted to form a stop for the bars packed on said table, the other end of said trigger normally contacting with the said table but adapted to project through the opening in said table when in a predetermined position with said table, and a plurality of reciprocating pusher bars having angularly positioned heads thereon adapted to turn the said bars into edgewise relation and pack them on said table, said pusher bars sliding in grooves having angularly disposed bottoms in said table.

9. Bar piling mechanism comprising in combination, a table having transversely extending channels therein, a plurality of receiving skids leading to said table, sliding carriages mounted in the channels in said table, counterweights secured to the said carriages, a plurality of pivotally mounted angularly shaped triggers secured to said carriages, one end of said triggers adapted to normally extend above the surface of said table and the other end adapted to engage against the said table throughout the normal operation of the device and adapted to project through an opening whereby the said bars pass over the said trigger when in a predetermined position on said table, and reciprocating pusher bars adapted to engage the said bars while on said skids, whereby the bars are turned into edgewise position and packed against the said triggers.

10. In combination with a hot bed, a bar packing table having a plurality of transverse channels therein, receiving skids secured to said hot bed and adapted to be raised and lowered, a sliding carriage mounted in the channels on said table, triggers carried by said sliding mounted carriages, normally projecting above the top of the table and adapted in a predetermined position on said table to move below the surface thereof, whereby the said bars are allowed to fall to flat position, and means for removing the said bars away from the pack.

11. Bar piling means comprising in combination, a table, means on said table projecting above the surface thereof for receiving the first bar, means for packing the said bars successively as they are deposited upon the said table, and means at one side of the said table operable to permit the bars to drop out of the pack at the side of the table adjacent the bar removal means.

12. Bar piling means comprising in combination, a table, movably mounted means connected with said table to engage the first bar of the pack, and packing bars adapted to move the said bars successively into the said pack.

13. Bar piling means comprising in combination, a table, movably mounted means on said table to engage the first bar of the pack, the said means being adapted to pass below the surface of the table when in a predetermined position on said table, and reciprocating bars adapted to turn said bars and pack them on said table.

14. Bar packing mechanism comprising in combination, a table, stop associated with said table, said stop being slidable relative to said table, means for stacking bars in pack relation against said stop, said stop including a pivotally mounted member arranged to project above said table, said member being depressible beneath the table surface to allow free movement of said bars.

15. The combination with a cooling bed having a bed surface for slidably supporting a pack, of means for placing flat bars on edge on one side of the bed, means for supporting the bars so positioned against overturning during the formation of a pack and during their sliding movement across the bed, said means including a pivotally mounted member having an arm arranged to project above the surface of said bed, said member being depressible beneath the surface of said bed to allow free movement of the bars.

16. Bar packing mechanism comprising in combination, a table, a slide mounted in said table, a bell crank lever pivoted to said slide, said lever including an arm adapted to project above the surface of said table during the major part of the movement of said slide, means for packing bars on said table against the projecting arm of said lever whereby a pack of bars is formed and the slide is rearwardly moved, said table having a slotted opening to permit the bell crank lever to pivot and depress the upwardly projecting arm beneath the table surface.

Signed at Gary, Indiana, this 9th day of May, 1927.

RANDOLPH B. HANCOCK.